United States Patent
Rozenman et al.

(10) Patent No.: US 9,898,388 B2
(45) Date of Patent: Feb. 20, 2018

(54) NON-INTRUSIVE SOFTWARE VERIFICATION

(71) Applicant: Mentor Graphics Corporation, Wilsonville, OR (US)

(72) Inventors: Alex Rozenman, Rishon le Zion (IL); Vladimir Pilko, Raanana (IL)

(73) Assignee: Mentor Graphics Corporation, Wilsonville, OR (US)

(*) Notice: Subject to any disclaimer, the term of this patent is extended or adjusted under 35 U.S.C. 154(b) by 0 days.

(21) Appl. No.: 14/721,191

(22) Filed: May 26, 2015

(65) Prior Publication Data
US 2015/0339214 A1 Nov. 26, 2015

Related U.S. Application Data

(60) Provisional application No. 62/002,295, filed on May 23, 2014.

(51) Int. Cl.
G06F 11/36 (2006.01)
G06F 9/455 (2006.01)
G06F 9/45 (2006.01)

(52) U.S. Cl.
CPC .......... *G06F 11/3664* (2013.01); *G06F 8/447* (2013.01); *G06F 9/455* (2013.01); *G06F 9/45516* (2013.01); *G06F 11/36* (2013.01); *G06F 11/3636* (2013.01); *G06F 11/3644* (2013.01)

(58) Field of Classification Search
CPC ............ G06F 9/45516; G06F 11/3644; G06F 11/3636; G06F 8/447; G06F 11/36; G06F 9/455; G06F 11/3664
See application file for complete search history.

(56) References Cited

U.S. PATENT DOCUMENTS

| | | | | |
|---|---|---|---|---|
| 5,930,509 A * | 7/1999 | Yates | ............. | G06F 9/4552 717/146 |
| 6,968,540 B2 * | 11/2005 | Beck | ............. | G06F 9/443 712/E9.084 |
| 2004/0040013 A1 * | 2/2004 | Kalra | ............. | G06F 11/362 717/129 |
| 2005/0289396 A1 * | 12/2005 | Hooper | ............. | G06F 11/3664 714/34 |

(Continued)

OTHER PUBLICATIONS

Balau, Hello world for bare metal ARM using QEMU, pp. 1-24, Feb. 28, 2010.*

*Primary Examiner* — Viva Miller
(74) *Attorney, Agent, or Firm* — Banner & Witcoff, Ltd.

(57) ABSTRACT

This application discloses a computing system configured to simulate an embedded system including a processor capable of executing embedded software, compile the embedded software into a format capable of execution by the computing system, insert instrumentation code into the compiled embedded software, and execute the compiled embedded software and the instrumentation code. The execution of the compiled embedded software can simulate execution of the embedded software by the processor in the simulated embedded system, while the execution of the instrumentation code can configure the computing system to gather information corresponding to the execution of the compiled embedded software.

18 Claims, 6 Drawing Sheets

COMPUTING ENVIRONMENT

(56) References Cited

U.S. PATENT DOCUMENTS

| | | | | |
|---|---|---|---|---|
| 2007/0089097 A1* | 4/2007 | Hu | ............ | G06F 8/443 |
| | | | | 717/132 |
| 2008/0244507 A1* | 10/2008 | Hodson | ............ | G06F 9/545 |
| | | | | 717/106 |
| 2008/0244530 A1* | 10/2008 | Mitran | ............ | G06F 11/3644 |
| | | | | 717/128 |
| 2010/0199265 A1* | 8/2010 | Maybee | ............ | G06F 11/3644 |
| | | | | 717/130 |
| 2012/0029899 A1* | 2/2012 | Dorfel | ............ | G06F 11/3457 |
| | | | | 703/21 |

* cited by examiner

NON-INTRUSIVE SOFTWARE VERIFICATION

RELATED APPLICATION

This application claims priority to U.S. Provisional Patent Application Ser. No. 62/002,295, filed May 23, 2014, which is incorporated by reference herein.

TECHNICAL FIELD

This application is generally related to electronic design automation and, more specifically, to non-intrusive software verification in a virtual prototype environment.

BACKGROUND

Embedded systems often perform dedicated functions within larger mechanical or electrical systems, such as cars, telephones, modems, robots, appliances, toys, security systems, pacemakers, televisions, set-top boxes, digital watches, or the like. Most of these embedded systems include one or more processing devices executing embedded software—typically written in in C, C++, or the like—that can allow the embedded systems to perform the dedicated functions under real-time computing constraints, for example, by utilizing a real-time operating system, such as Nucleus real-time operating system (RTOS), or the like.

Since embedded software is typically developed for a small range of functionality specific to a particular hardware platform of the embedded system, verification and debugging of the corresponding embedded software can be difficult. Most verification and debugging of the embedded software is performed by downloading a compiled version of the embedded software onto a physical board implementing a prototype of the particular hardware in the embedded system. Instrumentation is often added to both the prototyped hardware and the embedded software, which can aid in the verification and debugging processes. For example, the prototyped hardware on the physical board can include hardware instrumentation, such as probes, monitoring components, or the like, which can gather information of the prototyped processing devices on the physical board, such as processor states, register values, or the like. The prototyped hardware on the physical board also can include specialize hardware to store the gathered information and route the gather information to a verification and debugging tool remote from the physical board. The embedded software also can include instrumentation code that, once compiled, can be downloaded to the physical board. This instrumentation code can include break points, or other added code that can trace and/or profile the operation of the embedded software.

The verification and debugging tool can utilize the information gathered from the instrumentation to both the hardware on the physical board and the embedded software to trace operation of the embedded software as well as to profile, such as determine coverage of the embedded software. While these techniques can help to verify and debug some of the embedded software, the added instrumentation can alter the behavior of the embedded system, for example, disrupting the real-time processor behavior, slowing down runtime operation, or the like, which can hide some problems in the embedded system.

SUMMARY

This application discloses a computing system configured to software verification utilizing a non-intrusive tracing technique. The computing system can simulate an embedded system including a processor capable of executing embedded software, compile the embedded software into a format capable of execution by the computing system, insert instrumentation code into the compiled embedded software, and execute the compiled embedded software and the instrumentation code. The execution of the compiled embedded software can simulate execution of the embedded software by the processor in the simulated embedded system, while the execution of the instrumentation code can configure the computing system to gather information corresponding to the execution of the compiled embedded software. Embodiments of non-intrusive software verification are described in greater detail below.

DETAILED DESCRIPTION

Illustrative Operating Environment

The execution of various applications may be implemented using computer-executable software instructions executed by one or more programmable computing devices. Because these embodiments of the invention may be implemented using software instructions, the components and operation of a generic programmable computer system on which various embodiments of the invention may be employed will first be described.

Figure 1:
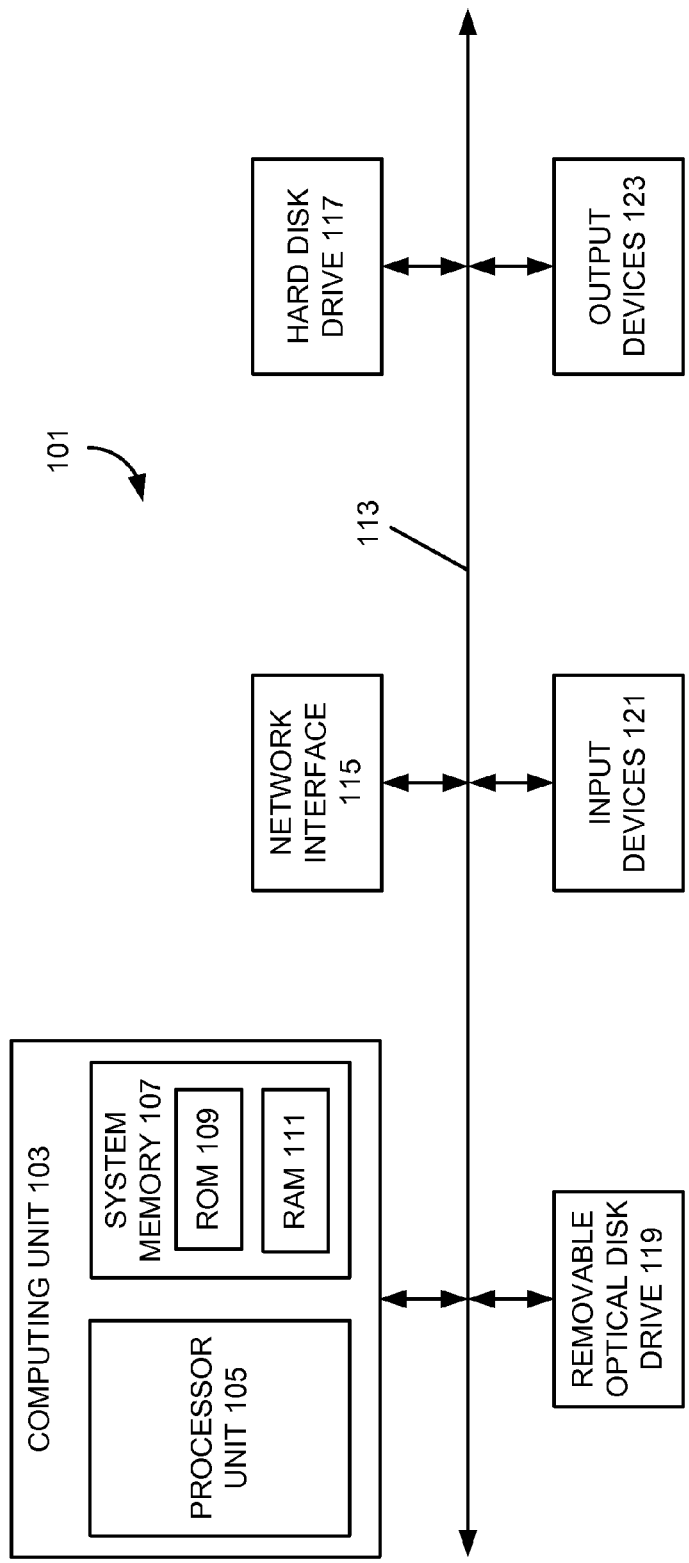
FIGS. 1 and 2 illustrate an example of a computer system of the type that may be used to implement various embodiments of the invention.

Various examples of the invention may be implemented through the execution of software instructions by a computing device, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional memory storage devices, such as a "hard" magnetic disk drive 115, a removable magnetic disk drive 117, an optical disk drive 119, or a flash memory card 121. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computer 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus (USB) connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol (TCP) and the Internet protocol (IP). Also, the interface 127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 101 is illustrated as an example only, and it not intended to be limiting. Various embodiments of the invention may be implemented using one or more computing devices that include the components of the computer 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
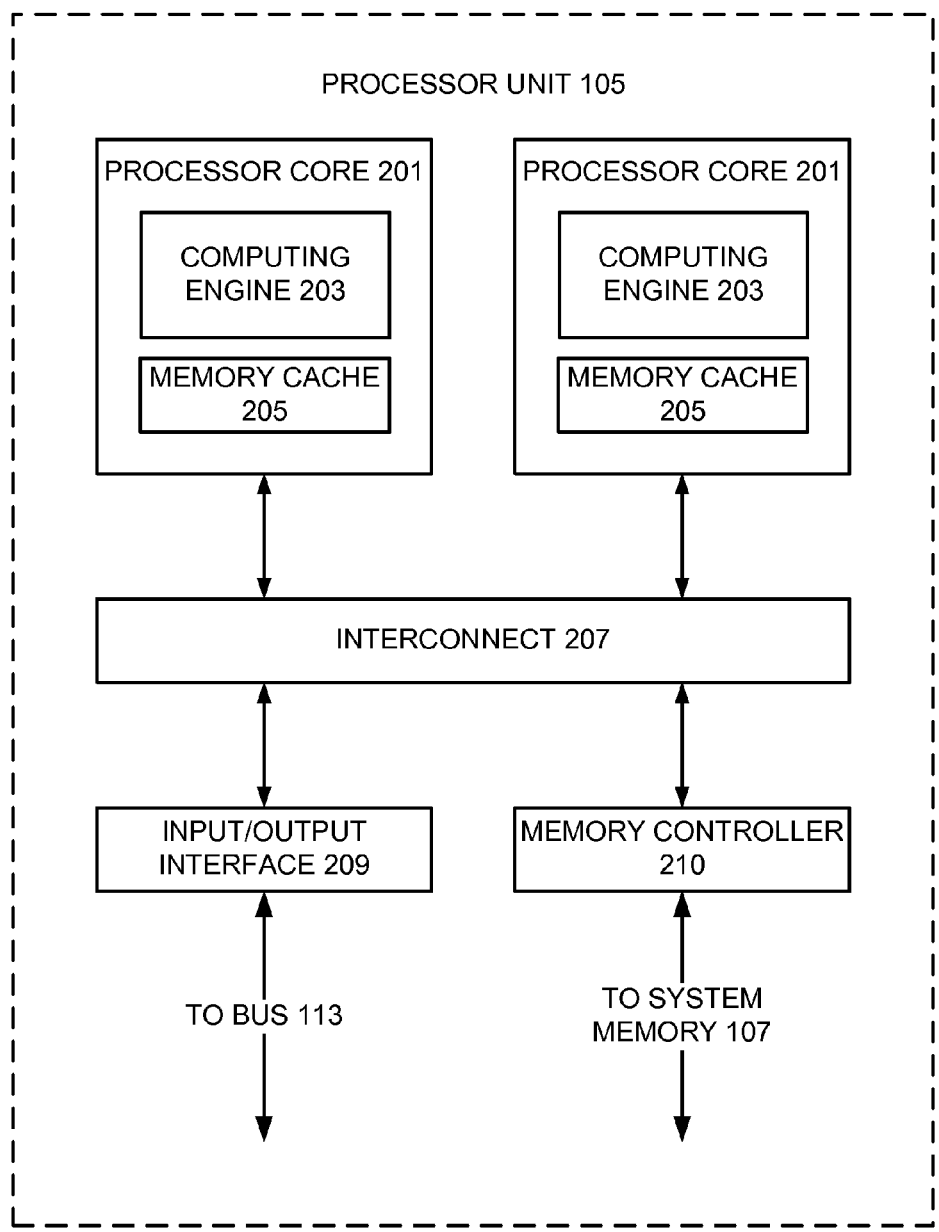

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 211. The input/output interface 209 provides a communication interface between the processor unit 201 and the bus 113. Similarly, the memory controller 211 controls the exchange of information between the processor unit 201 and the system memory 107. With some implementations of the invention, the processor units 201 may include additional components, such as a high-level cache memory accessible shared by the processor cores 201.

It also should be appreciated that the description of the computer network illustrated in FIG. 1 and FIG. 2 is provided as an example only, and it not intended to suggest any limitation as to the scope of use or functionality of alternate embodiments of the invention.

Non-Intrusive Software Verification

Figure 3:
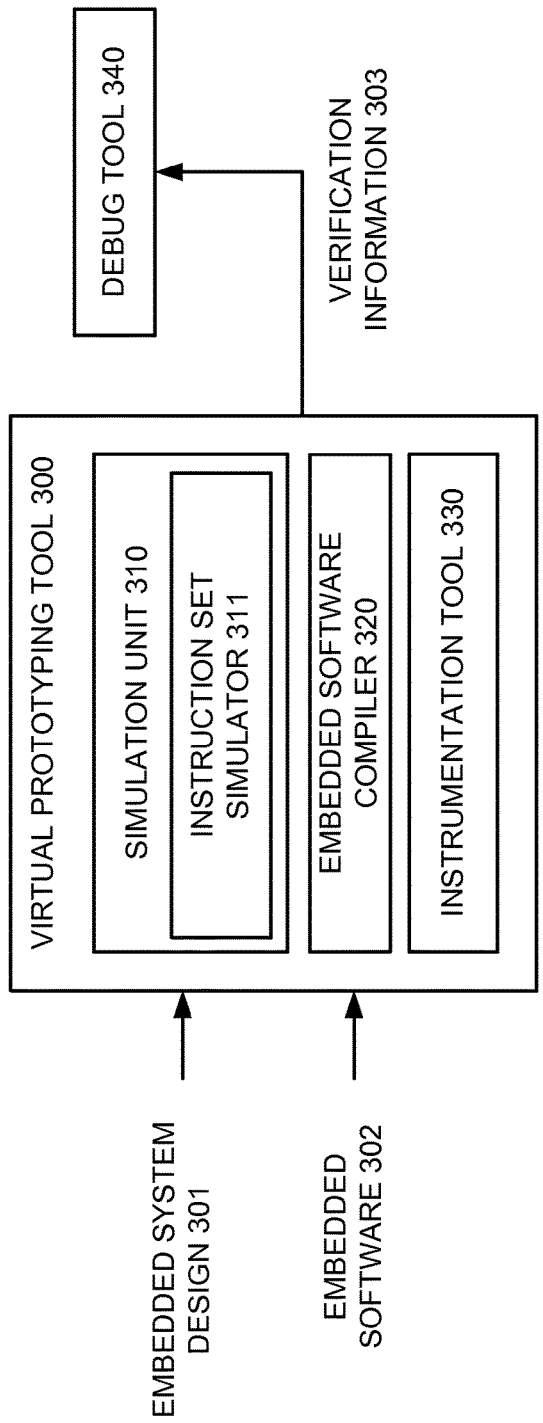
FIG. 3 illustrates an example system including a virtual prototyping tool and a debug tool according to various embodiments of the invention.

FIG. 3 illustrates an example system including a virtual prototyping tool 300 and a debug tool 340 according to various embodiments of the invention. Referring to FIG. 3, the virtual prototyping tool 300 can include a simulation unit 310 to implement a simulation environment or virtual platform. In some embodiments, the simulation unit 310 can include one more simulation models to mimic behavior of hardware in an embedded system described in an embedded system design 301. For example, the simulation unit 310 can include an instruction set simulator (ISS) 311, such as a quick emulator (QEMU) instruction set simulator supporting a bare-metal stack, as the simulation model for the virtual prototyping tool 300. A computing system implementing the virtual prototyping tool 300 can execute code corresponding to the simulation unit 310 and/or the instruction set simulator 311, which can allow the virtual prototyping tool 300 to simulate or emulate the hardware of the embedded system described in the embedded system design 301.

The virtual prototyping tool 300 also can receive embedded software 302 written for execution by the hardware in the embedded system described in the embedded system design 301. In some embodiments, the embedded software 302 can be written in a high-level code, such as a C, C++, or the like, for example, in a *.c file format, a *.h file format, a *.cpp file format, or the like, which can be translated into a software image corresponding to a native instruction set for the hardware described in the embedded system design 301. In some embodiments, a user compiler external to the virtual prototyping tool 300 can perform the translation of the high-level coding of the embedded software 302 into the software image corresponding to a native instruction set for the hardware described in the embedded system design 301. The virtual prototyping tool 300 also can receive the embedded software 302 as the software image of the native instruction set for the hardware described in the embedded system design 301. The user compiler also can generate debug information for the code being compiled, for example, by implementing one or more standard compiler options of the user compiler. In some embodiments, the debug information can have a format capable of storing enough information to allow for source-level debugging of the embedded software 302, for example, in a standardized DWARF debugging data format or the like.

The virtual prototyping tool 300 can include an embedded software compiler 320 to compile the embedded software 302 into a format capable of being executed by a computing system implementing the virtual prototyping tool 300. In some embodiments, the embedded software compiler 320 can compile the software image corresponding to the native instruction set for the hardware described in the embedded system design 301 into binary code corresponding to hardware in the computing system. The embedded software compiler 320 can be a just-in-time (JIT) compiler, which can compile portions of the embedded software 302—on an as-needed basis—into the format capable of execution by the computing system implementing the virtual prototyping tool 300.

The computing system implementing the virtual prototyping tool 300 can execute the compiled embedded software, which, in some embodiments, can alter functionality or behavior of the hardware of the embedded system described in the simulation environment. Although the computing system executes code, such as the instruction set simulator 311, which simulates or emulates the embedded system as well as executes the compiled embedded software, the computing system performs these two code executions in different contexts, for example, with the execution of the compiled embedded software performed on top of the execution of the code implementing the simulation environment.

The virtual prototyping tool 300 can include an instrumentation tool 330 to insert verification code or instrumentation code into the compiled embedded software for execution by the computing system. The verification code, when executed by the computing system, can prompt the computing system to generate verification information 303 corresponding to the execution of the embedded software in the simulation environment implemented by the virtual prototyping tool 300. In some embodiments, the verification information 303 can include information corresponding to code coverage, such as whether one or more lines of the embedded software 302 were executed by the computing system. The verification information 303 also can include information corresponding to trace points in the embedded software 302, such when a function in the embedded software 302 is called during execution and when that execution of that function has terminated. The verification information 303 also can include information corresponding to a profile of the embedded software 302, such a number of functions called during execution of the embedded software 302, length of execution time on each of the called functions, semantics on how the functions were called, or the like. The profile of the embedded software 302, in some embodiments, can help a programmer to ascertain or understand location and magnitude of various execution bottlenecks in the embedded software 302. When the verification code injects a fault into the simulation environment, the verification information 303 can correspond to the execution of the compiled embedded software and/or simulated hardware in response to the injected fault.

In some embodiments, the instrumentation tool 330 can insert the verification code into the compiled embedded software based on the debug information generated during translation of the embedded software 302 into the software image, for example, by the user compiler. The instrumentation tool 330 can determine which verification code to insert into the compiled embedded software and where to insert that verification code based, at least in part, on debug symbols in the debug information.

Since the instrumentation tool 330 can insert the verification code into the compiled embedded software, for example, during compilation of the embedded software 302 by the embedded software compiler 320, the virtual prototyping tool 300 can effectively instrument the embedded software 302 without actually altering source code or software image of the embedded software 302. This can allow the instrumentation tool 330 to dynamically perform non-intrusive verification of the embedded software 302 in the simulation environment without having to re-instrument and recompile the embedded software 302. The context separation between the implementation of the simulation environment by the computing system and the execution of the compiled embedded software by the computing system also can allow the computing system to retain functionality, timing, and/or power of the embedded system in the simulation environment, for example, not disrupting the real-time processor behavior, as the sequence of compiled embedded software execution remains unchanged. Embodiments of the injection of verification code in the simulation environment implemented by the virtual prototyping tool 300 will be described below in greater detail.

The debug tool 340 can receive the verification information 303 from the virtual prototyping tool 300. The debug tool 340 can utilize the verification information 303 and the native code, such as the software image, to determine coverage of the embedded software 302 during execution, debug the embedded software 302 and/or its interaction with the hardware in the embedded system design 301 based on execution traces of the embedded software, profile the embedded software 302, or the like.

Figure 4:
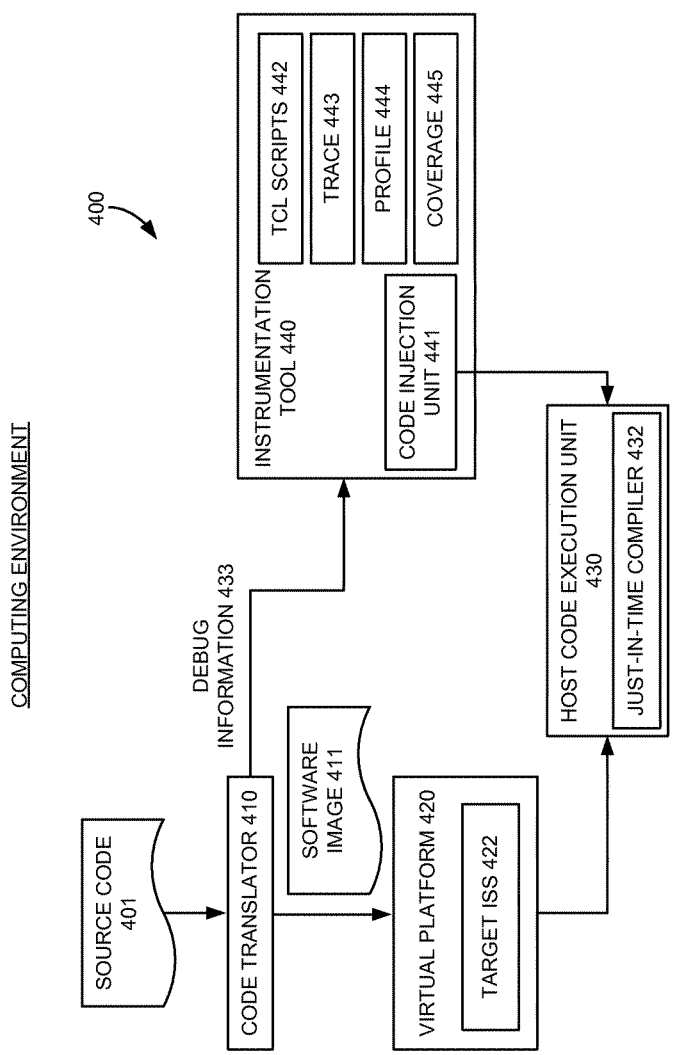
FIG. 4 illustrates an example computing environment implementing a virtual prototyping tool according to various embodiments of the invention.

FIG. 4 illustrates an example computing environment 400 implementing a virtual prototyping tool according to various embodiments of the invention. Referring to FIG. 4, the computing environment 400 can include a code translator 410 to translate the source code 401 into a software image 411 corresponding to a native instruction set for hardware in an embedded system. In some embodiments, the source code 401 can be written in a high-level code, such as a C, C++, or the like, for example, in a *.c file format, a *.h file format, a *.cpp file format, or the like. The code translator 410 can translate the source code 401 into a binary format compatible with the hardware in the embedded system.

The code translator 410, for example, implemented by a user compiler, also can generate debug information 433 for the software image 411, for example, by implementing one or more standard compiler options of the code translator 410. In some embodiments, the debug information 433 can have a format capable of storing enough information to allow for source-level debugging of the source code 410, for example, in a standardized DWARF debugging data format or the like.

The computing environment 400 can include a virtual platform 420 to implement a simulation environment for the hardware of the embedded system. For example, the virtual platform 420 can implement one more simulation models to mimic behavior of the hardware in the embedded system. For example, the virtual platform 420 can include a target instruction set simulator (ISS) 422, such as a quick emulator (QEMU) instruction set simulator supporting a bare-metal stack, as the simulation model for the virtual platform 420. A computing system implementing the virtual prototyping tool can execute code corresponding to the virtual platform 420 and/or the target instruction set simulator 422, which can allow the virtual prototyping tool to simulate or emulate the hardware of the embedded system.

The virtual prototyping tool in the computing environment 400 can include a host code execution unit 430 to order or sequence code for execution by the computing system. The host code execution unit 430 can include a just-in-time (JIT) compiler 432 to compile the software image 411 corresponding to the native instruction set for the hardware in the embedded system into binary code corresponding to hardware in the computing system. The just-in-time compiler 432 can compile portions of the software image 411—on an as-needed basis—into the format capable of execution by the computing system implementing the virtual prototyping tool 400. In some embodiments, the target instruction set simulator 422 can translate the software image 411 into host-compatible instructions, which can be compiled by the just-in-time compiler 432.

The virtual prototyping tool implemented by the computing environment 400 can include an instrumentation tool 440 having a code injection unit 441 to insert verification code or instrumentation code into the software image 411 compiled by the just-in-time compiler 432 for execution by the computing system. The verification code, when executed by the computing system, can prompt the computing system to generate verification information corresponding to the execution of the software image 411 in the virtual platform 420 implemented by the virtual prototyping tool 400.

In some embodiments, the verification code or instrumentation code can be in the form of a scripting language, such as a Tool Command Language (TCL) language implemented with TCL scripts 442 residing within or generated by the instrumentation tool 440. In some embodiments, the instrumentation tool 440 can insert the verification code in the compiled software image 411 based on the debug information generated by the code translator 410. The instrumentation tool 440 can utilize trace 443, profile 444, and coverage 445 functionality to determine which verification code to insert into the compiled software image 411 and where to insert that verification code based, at least in part, on debug symbols in the debug information.

In some embodiments, when the instrumentation tool 440 intends to trace execution of the compiled software image 411, such as such when a function in the source image 411 is called during execution and when that execution of that function has terminated, the instrumentation tool 440 can generate trace point TCL scripts utilize the trace functionality 443. When the instrumentation tool 440 intends to profile execution of the compiled software image 411, such as such a number of functions called during execution of the software image 411, length of execution time on each of the called functions, semantics on how the functions were called, or the like, the instrumentation tool 440 can generate profiling TCL scripts utilizing the profile functionality 445. When the instrumentation tool 440 intends to determine code coverage, such as whether one or more lines of the software image 411 were executed by the computing system, the instrumentation tool 440 can generate code coverage TCL scripts utilize the coverage functionality 445. The profile of the software image 411, in some embodiments, can help a programmer to ascertain or understand location and magnitude of various execution bottlenecks in the software image 411.

Figure 5:
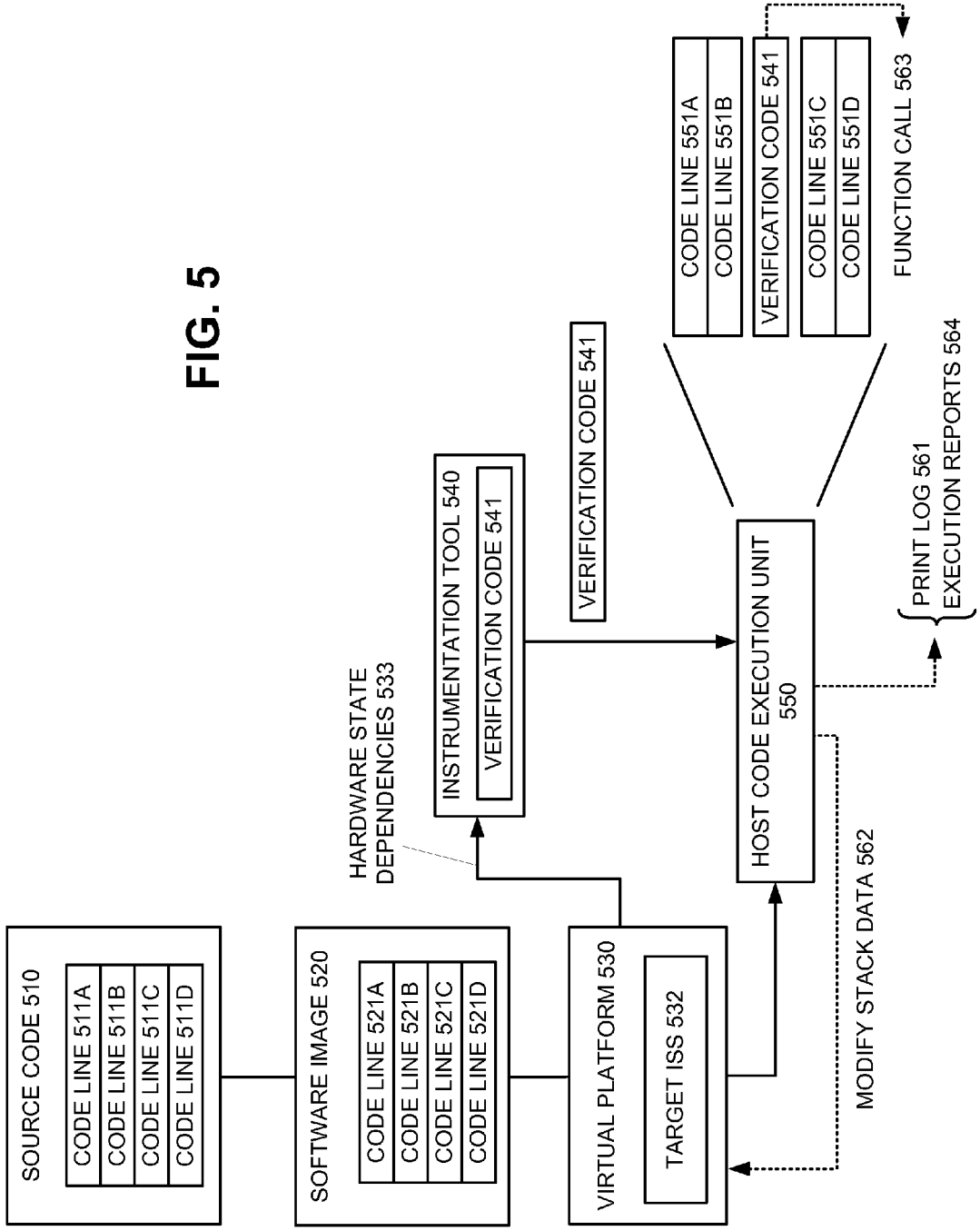
FIG. 5 illustrates example functionality of a virtual prototyping tool instrumenting embedded software non-intrusively according to various examples of the invention.

FIG. 5 illustrates example functionality of a virtual prototyping tool instrumenting embedded software non-intrusively according to various examples of the invention. Referring to FIG. 5, a user compiler, for example, external to the virtual prototyping tool, can translate source code 510 of an embedded program into a software image 520 corresponding to a native instruction set for hardware in an embedded system. The source code 510 can be written in a high-level code, such as a C, C++, or the like, having example code lines 511A-511D, for example, in a *.c file format, a *.h file format, a *.cpp file format, or the like. The software image 520 can be a binary representation of the source code 510 that is compatible with the hardware in the embedded system. The software image 520 can include example code lines 521A-521D, which can correspond to the code lines 511A-511D in the source code 510.

The virtual prototyping tool can include a virtual platform 530 to implement a simulation environment for the hardware of the embedded system. For example, the virtual platform 530 can implement one more simulation models to mimic behavior of the hardware in the embedded system. For example, the virtual platform 530 can include a target instruction set simulator (ISS) 532, such as a quick emulator (QEMU) instruction set simulator supporting a bare-metal stack, as the simulation model for the virtual platform 530. A computing system implementing the virtual prototyping tool can execute code corresponding to the virtual platform 530 and/or the target instruction set simulator 532, which can allow the virtual prototyping tool to simulate or emulate the hardware of the embedded system.

The virtual prototyping tool can include a host code execution unit 550 to compile the software image 520 corresponding to the native instruction set for the hardware in the embedded system into binary code corresponding to hardware in the computing system. For example, the compiled software image can include example code lines 551A-551D, which can correspond to the code lines 521A-521D in the software image 520 and to the code lines 511A-511D in the source code 510.

The virtual prototyping tool can include an instrumentation tool 540 to insert verification code or instrumentation code into the compiled code lines 551A-551D for execution by the computing system. The instrumentation tool 540 can determine which verification code to insert into the compiled software image and where to insert that verification code. In this example, the instrumentation tool 540 inserts a verification code 541 between compiled code lines 551B and 551C. The verification code 541, when executed by the computing system, can prompt the computing system to generate verification information corresponding to the execution of the software image 520 in the virtual platform 530 implemented by the virtual prototyping tool.

In response to the computing system executing the injected verification code 541, the computing system can perform various functions. For example, the verification code 541 can prompt the computing system to non-intrusively generate a print log 561 or execution reports 564 corresponding to the execution of at least one of the compiled code lines 551A-551D. The print log 561 or execution reports 564 may be utilize, for example, by a debug tool, to determine code coverage for the execution of the source code 510, to trace the execution of the source code 510, to profile the execution of the source code 510, or the like. In some embodiments, the execution of the verification code 541 by the computing system can prompt the computing system to perform additional operations in the virtual platform 530, for example, by directing modification of stack data 562 of simulated hardware in the virtual platform 530 or by making a function call 563 in the compiled code lines. These additional operations can dynamically inject faults into the virtual platform 530 or may help debug the source code 510.

Figure 6:
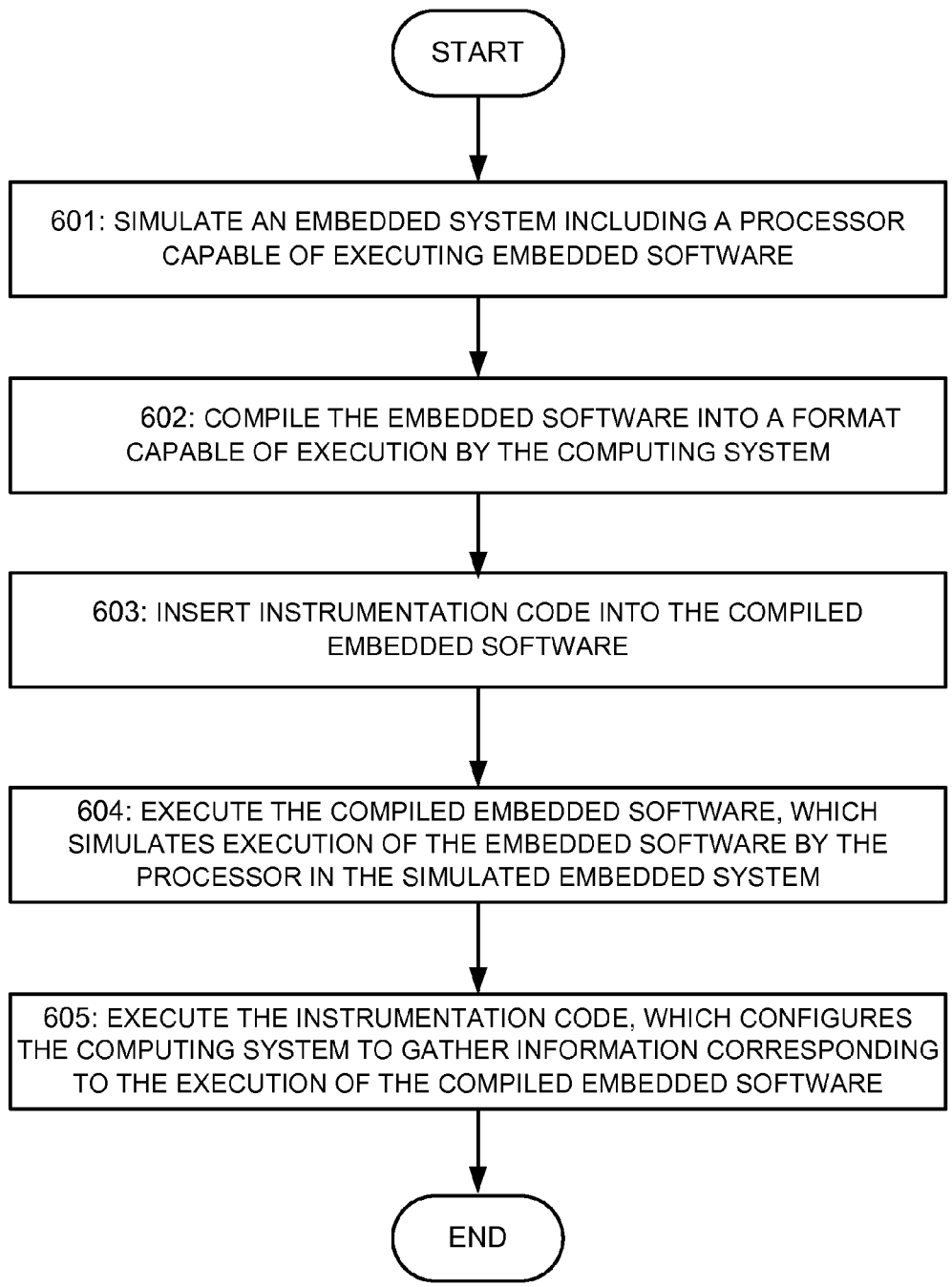
FIG. 6 illustrates a flowchart showing an example process for non-intrusive instrumentation of embedded software according to various examples of the invention.

FIG. 6 illustrates a flowchart showing an example process for non-intrusive instrumentation of embedded software according to various examples of the invention. Referring to FIG. 6, in a block 601, a computing system can simulate an embedded system including a processor capable of executing embedded software. In some embodiments, the computing system can implement a simulation environment or virtual platform, which can include one more simulation models to mimic behavior of hardware in the embedded system. For example, the computing system can include an instruction set simulator (ISS), such as a quick emulator (QEMU) instruction set simulator supporting a bare-metal stack, as the simulation model for the simulation environment.

In a block 602, the computing system can compile the embedded software into a format capable of execution by the computing system. The computing system can translate source code for the embedded software into a software image of the embedded software corresponding to a native instruction set for hardware in the embedded system. In some embodiments, the source code for the embedded software can be written in a high-level code, such as a C, C++, or the like. The computing system can compile the software image of the embedded software from the native instruction set corresponding to the hardware in the embedded system into binary code corresponding to hardware in the computing system. In some embodiments, the computing system can perform the compilation of the software image of the embedded software with a just-in-time (JIT) scheme.

In a block 603, the computing system can insert instrumentation code into the compiled embedded software. In some embodiments, the instrumentation code can be in the form of a scripting language, such as a Tool Command Language (TCL) language implemented with TCL scripts. In some embodiments, the computing system can insert the instrumentation code into the compiled software image based on debug information generated during compilation of the software image. For example, the computing system can determine which instrumentation code to insert into the compiled software image and where to insert that instrumentation code based, at least in part, on debug symbols in the debug information.

In a block 604, the computing system can execute the compiled embedded software, which simulates execution of the embedded software by the processor in the simulated embedded system, and in a block 605, the computing system can execute the instrumentation code, which configures the computing system to gather information corresponding to the execution of the compiled embedded software.

In some embodiments, the gathered information can include information corresponding to code coverage, such as whether one or more lines of the embedded software were executed by the computing system. The gathered information also can include information corresponding to trace points in the embedded software, such when a function in the embedded software is called during execution and when that execution of that function has terminated. The gathered information also can include information corresponding to a profile of the embedded software, such a number of functions called during execution of the embedded software, length of execution time on each of the called functions, semantics on how the functions were called, or the like. The profile of the embedded software, in some embodiments, can help a programmer to ascertain or understand location and magnitude of various execution bottlenecks in the embedded software. When the verification code injects a fault into the simulation environment, the gathered information can correspond to the execution of the compiled embedded software and/or simulated hardware in response to the injected fault.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to certain processes, it should be appreciated that various examples of the invention may be implemented using any desired combination of processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
    simulating, by a computing system, an embedded system including a processor capable of executing embedded software, wherein the simulating comprises:
        translating, by the computing system, source code for the embedded software into a software image configured as a native instruction set for the processor in the embedded system, wherein the translating generates debug information corresponding to the software image;
        compiling, by the computing system, the software image corresponding to the embedded software into a format capable of execution by the computing system;
        selecting, by the computing system and based on the debug information corresponding to the software image, one or more scripts from a plurality of scripts;
        inserting, by the computing system, the one or more scripts into the compiled software image at locations determined based, at least in part, on the debug information corresponding to the software image; and
        executing, by the computing system, the compiled software image and the one or more scripts, wherein the execution of the compiled software image simulates execution of the embedded software by the processor in the simulated embedded system, and wherein the execution of the one or more scripts configures the computing system to gather information corresponding to execution of the embedded software.

2. The method of claim 1, further comprising utilizing, by the computing system, the gathered information corresponding to the execution of the embedded software to trace the embedded software, profile the embedded software, determine coverage of the embedded software, or verify functionality of the embedded software.

3. The method of claim 1, wherein the source code remains unmodified by the one or more scripts.

4. The method of claim 1, wherein simulating the embedded system is performed by a quick emulator (QEMU) Instruction Set Simulator (ISS) supporting a bare-metal stack implemented by the computing system.

5. The method of claim 1, wherein compiling the software image is performed with a just-in-time (JIT) compiler implemented by the computing system.

6. The method of claim 1, wherein the one or more scripts comprise one or more Tool Command Language (TCL) scripts.

7. A system comprising:
    a memory system configured to store computer-executable instructions; and
    a computing system which, in response to execution of the computer-executable instructions, is configured to:
        simulate an embedded system including a processor capable of executing embedded software;
        translate source code for the embedded software into a software image configured as a native instruction set for the processor in the embedded system, which generates debug information corresponding to the software image;
        compile the software image corresponding to the embedded software into a format capable of execution by the computing system;
        select, based on the debug information corresponding to the software image, one or more scripts from a plurality of scripts;
        insert the one or more scripts into the compiled software image at locations determined based, at least in part, on the debug information corresponding to the software image; and
        execute the compiled software image and the one or more scripts, wherein the execution of the compiled software image simulates execution of the embedded software by the processor in the simulated embedded system, and wherein the execution of the one or more scripts configures the computing system to gather information corresponding to execution of the embedded software.

8. The system of claim 7, wherein the computing system, in response to execution of the computer-executable instructions, is further configured to utilize the gathered information corresponding to the execution of the embedded software to trace the embedded software, profile the embedded software, determine coverage of the embedded software, or verify functionality of the embedded software.

9. The system of claim 7, wherein the source code remains unmodified by the one or more scripts.

10. The system of claim 7, wherein the computing system, in response to execution of the computer-executable instructions, is further configured to simulate the embedded system with a quick emulator (QEMU) Instruction Set Simulator (ISS) supporting a bare-metal stack.

11. The system of claim 7, wherein the computing system, in response to execution of the computer-executable instructions, is further configured to compile the software image with a just-in-time (JIT) compiler.

12. An apparatus comprising a memory system storing instructions, that when executed, cause a computing system to:
    simulate an embedded system including a processor capable of executing embedded software;
    translate source code for the embedded software into a software image configured as a native instruction set for the processor in the embedded system, wherein the translating generates debug information corresponding to the software image;
    compile the software image corresponding to the embedded software into a format capable of execution by the computing system;
    select, based on the debug information corresponding to the software image, one or more scripts from a plurality of scripts;

insert the one or more scripts into the compiled software image at locations determined based, at least in part, on the debug information corresponding to the software image; and execute the compiled software image and the one or more scripts, wherein the execution of the compiled software image simulates execution of the embedded software by the processor in the simulated embedded system, and wherein the execution of the one or more scripts configures the computing system to gather information corresponding to execution of the embedded software.

13. The apparatus of claim 12, wherein the instructions are configured to, when executed, cause the computing system to utilize the gathered information corresponding to the execution of the embedded software to trace the embedded software, profile the embedded software, determine coverage of the embedded software, or verify functionality of the embedded software.

14. The apparatus of claim 12, wherein the source code for the embedded software remains unmodified by the inserting of the one or more scripts.

15. The apparatus of claim 12, wherein the instructions, when executed, cause simulation of the embedded system by a quick emulator (QEMU) Instruction Set Simulator (ISS) supporting a bare-metal stack implemented by the computing system.

16. The apparatus of claim 12, wherein the instructions, when executed, cause the computing system to compile the software image with a just-in-time (JIT) compiler implemented by the computing system.

17. The apparatus of claim 12, wherein the one or more scripts comprise one or more Tool Command Language (TCL) scripts.

18. The system of claim 7, wherein the one or more scripts comprise one or more Tool Command Language (TCL) scripts.

* * * * *